(12) United States Patent
Tang et al.

(10) Patent No.: US 7,720,561 B2
(45) Date of Patent: May 18, 2010

(54) OPTIMIZING NON-PRODUCTIVE PART MOTION IN AN AUTOMATED TAPE LAYDOWN MACHINE

(75) Inventors: Wei-Pai Tang, Redmond, WA (US);
Brice Johnson, Federal Way, WA (US);
Daniel Edward Gonsor, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 318 days.

(21) Appl. No.: 11/859,125

(22) Filed: Sep. 21, 2007

(65) Prior Publication Data

US 2009/0082892 A1    Mar. 26, 2009

(51) Int. Cl.
*G06F 19/00*    (2006.01)
*G05B 13/02*    (2006.01)

(52) U.S. Cl. .................... 700/122; 700/28; 700/111; 700/173

(58) Field of Classification Search ............... 700/28, 700/97, 99, 111–114, 117–123, 127–129, 700/167, 173, 174; 702/182; 156/60, 166, 156/350
See application file for complete search history.

(56) References Cited

U.S. PATENT DOCUMENTS

| | | | | |
|---|---|---|---|---|
| 4,907,164 A * | 3/1990 | Guyder | ........................ | 700/173 |
| 5,006,990 A * | 4/1991 | Ward et al. | ..................... | 700/97 |
| 5,798,927 A * | 8/1998 | Cutler et al. | ................. | 700/188 |
| 6,112,792 A * | 9/2000 | Barr et al. | .................... | 156/441 |
| 6,128,546 A * | 10/2000 | Basista et al. | ................ | 700/166 |
| 6,322,733 B1 * | 11/2001 | Herbst | ........................ | 264/40.5 |
| 6,823,230 B1 * | 11/2004 | Jamalabad et al. | ........... | 700/119 |
| 7,376,480 B2 * | 5/2008 | Hagen et al. | ................. | 700/118 |
| 2007/0106418 A1 * | 5/2007 | Hagen et al. | ................. | 700/186 |
| 2007/0144676 A1 * | 6/2007 | Tang et al. | ................... | 156/425 |
| 2007/0150087 A1 * | 6/2007 | Tang et al. | ................... | 700/119 |
| 2007/0277919 A1 * | 12/2007 | Savol et al. | .................... | 156/64 |
| 2008/0215164 A1 * | 9/2008 | Denk et al. | .................... | 700/29 |

* cited by examiner

*Primary Examiner*—M. N. Von Buhr
(74) *Attorney, Agent, or Firm*—Tung & Associates

(57) ABSTRACT

The non-productive motion of an automatic composite tape laydown machine is optimized to increase the overall rate of the laydown. Ordering of tape courses is analyzed to determine the time required to move between courses using a time function that reflects operating characteristics and limitations of the tape laydown machine. The ordering is optimized by re-ordering, grouping and/or partitioning the tape courses so as to reduce the non-productive motion of the machine. The optimized ordering is used by a NC program that controls the operation of the machine.

26 Claims, 6 Drawing Sheets

OPTIMIZING NON-PRODUCTIVE PART MOTION IN AN AUTOMATED TAPE LAYDOWN MACHINE

TECHNICAL FIELD

This disclosure generally relates to methods and machines for fabricating composite structures, and deals more particularly with a method for minimizing the non-productive motion of an automated tape laydown machine in order to increase the overall rate of tape laydown.

BACKGROUND

Composite parts and structures such as those used in the automotive, marine and aerospace industries may be fabricated using automated composite material application machines, such as composite tape lamination machines and composite fiber placement machines, collectively referred to herein as tape laydown machines.

Some conventional composite material application machines, for example a flat tape lamination machine (FTLM) or a contoured tape lamination machine (CTLM), produce flat or gently contoured composite parts by laying relatively wide strips of composite tape onto generally horizontal or vertical tooling surfaces, such as a mandrel. Other conventional composite material application machines, for example, an automated fiber placement (AFP) machine, are used to produce generally cylindrical or tubular composite parts by wrapping relatively narrow strips of composite slit tape, or "tows", collimated into a wider band, around a rotating manufacturing tool, such as a mandrel.

Tape laydown machines have been devised that employ single or multiple composite material application heads that are operated by NC (numerical control) or CNC (computer numerical control) controllers which control movement of the application heads and ancillary functions, including applying and cutting composite tape "on the fly". In aerospace applications, these machines may be used to fabricate a wide variety of composite parts, such as, without limitation, flat spars, stringer charges, wing skins, and barrel-shaped sections, to name a few.

Composite parts of the type mentioned above may comprise multiple plies of varying thickness, complexity, and orientation. Automated application of the tape is broken down into sequences that consist of one or more ply segments of the same or different fiber orientation. All ply segments in a sequence are normally in laid before material application proceeds to the next sequence. The part is complete when all sequences have been laid. In order to control the tape laydown machine, path generation software is provided that controls the laydown of ply segments in terms of a set of courses of specified width, fiber orientation and length. The specific machine motions and head path are selected by the NC programmer based on a few simple rules, personal experience and intuition. The process of programming the machine path is more challenging where the part utilizes complex ply segments that may result in inefficient ordering, grouping and partitioning of courses within a ply.

Further complicating the task machine programming is the fact that different tape laydown machines possess differing dynamics and configurations. For example, differing machines may possess variations in acceleration, axes velocities, number of heads per machine, number of machines per lay-up cell, all of which may effect the decision of the programmer in optimizing the machine path. Additionally, there may be unique operational condition variables that may affect overall productivity, such as variations in between material cutting and material adding reliabilities, direction of travel, head turnaround motion, and other preferred operations conditions that can affect the overall machine productivity.

Once the machine paths for the courses are generated by the programmer, the NC program does not conduct any further processing to determine whether courses in line with each other should be grouped or combined into one path as a means to efficiently laydown the tape, or whether a generated course could be partitioned into individual pieces for greater laydown efficiency.

Accordingly, there is a need for a method of controlling a tape laydown machine that optimizes machine motions, reduces course-to-course, non-productive, motions and increases tape laydown efficiency for a variety of machine types. Embodiments of the disclosure are intended to satisfy this need.

SUMMARY

Embodiments of the disclosure provide a method for achieving efficient ordering of courses within a single ply by minimizing the total non-productive, motion of the tape laydown machine. By reducing the total non-productive motion, tape may be laid down at an overall greater rate, resulting in a reduction of the time required to fabricate parts. Tape courses are optimized by automated grouping, partitioning and sequencing of all or parts of the courses required to complete a ply. The automated optimization method reflects the constraints of each particular machine.

According to one embodiment, operation of an automated tape laydown is optimized by a method comprising the steps of: analyzing the course structure for each of the ply segments; identifying non-productive motion of the laydown machine during movement between courses; ordering the courses for each ply to reduce the non-productive motion of the machine; and, generating a set of machine readable instructions for controlling the laydown machine based on the course ordering. The method may further comprise the steps of: determining whether the non-productive motion exceeds a threshold value; determining the characteristics of the laydown machine; and, altering the ordering of the courses based on the characteristics of the laydown machine. Ordering of the courses may be performed by: performing a preliminary ordering of the courses; identifying nonproductive motion of the laydown machine during movement between the courses using a preliminary ordering; and, improving the ordering of the courses based on the identified, nonproductive motion. The courses may be ordered by grouping and/or partitioning the courses of a ply in a sequence.

According to another disclosed embodiment, a method is provided of operating a numerically controlled tape laydown machine used to fabricate a composite part. The method comprises the steps of: determining possible orders in which the courses of the tape may be laid down by the tape laydown machine; selecting one of the determined orders that optimizes the non-productive movement of the laydown machine; generating a set of machine readable instructions for controlling the tape laydown machines based on the selected order of courses; and, controlling the tape laydown machine using the machine readable instructions. The possible orders of the courses are determined by analyzing multiple groupings and partitions of the courses. Selection of an order for the courses may be performed by: performing a preliminary ordering of the courses; identifying nonproductive motion of the laydown machine during movement between the courses using the preliminary ordering; and, improving the ordering of the courses based on the identification of the nonproductive motion.

According to still another method embodiment, non-productive motion of an automated tape laydown machine may be minimized by a method comprising the steps of: selecting an initial ordering of courses over which the tape may be laid down by the tape laydown machine; determining the non-productive motion of the tape laydown machine based on the initial ordering of the courses; revising the initial ordering of the courses to reduce the non-productive motion; and, finalizing the ordering of the courses when the non-productive motion has been minimized. The method may further comprise the steps of: generating definitions of the tape courses and plies for each tape laying sequence required to fabricate the composite part; determining operating limits of the tape laydown machine; and, revising the initial ordering of the courses based on the determined machine limits. Determining the non-productive motion may include generating a cost function for the non-productive motion and using the cost function to determine the time traveled by the tape laydown machine between courses in the initial ordering of courses.

Other features, benefits and advantages of the disclosed embodiments will become apparent from the following description of embodiments, when viewed in accordance with the attached drawings and appended claims.

BRIEF DESCRIPTION OF THE ILLUSTRATIONS

DETAILED DESCRIPTION

Figure 1:
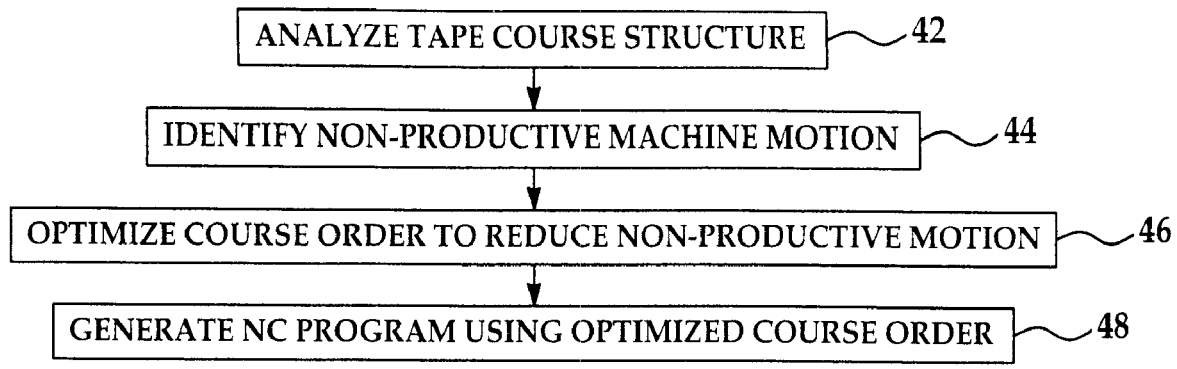
FIG. 1 is a flow diagram illustrating steps of one method embodiment for optimizing non-productive motion in an automatic tape laydown machine.

Referring to the drawing illustrations, embodiments of the disclosure maximize the overall rate of the application of composite materials on a part 10 by reducing nonproductive movements of an automatically operated tape laydown machine 12 that is used to laydown courses 19, 21 (FIG. 3) of tape over a mandrel 20 or similar tool. As shown in FIG. 1, a method of optimizing the operation of the tape laydown machine begins at step 42 by analyzing the tape course structure of a composite structure or part 10. Analysis of the tape course structure results in the identification of nonproductive machine motion at step 44. Having identified the nonproductive machine motion for a particular tape course structure, it may then be possible at 46 to optimize the course structure in order to reduce the nonproductive machine motion. After optimizing the tape course structure, programmed instructions may be generated at 48 for controlling the tape laydown machine 12. These programmed instructions, which may be an NC controller program, result in the machine 12 moving over the part 10 in a manner that minimize the non-productive motion of a tape application head 32.

Referring now particularly to FIGS. 2-5, the part may be any geometric configuration, but in the illustrated example, comprises a generally cylindrical section of an aircraft fuselage. In aircraft applications, embodiments of the disclosure may be used with various types of tape laydown machines to fabricate a wide variety of composite parts, such as flat spars, stringer charges, wing skins, to name a few.

Figure 2:
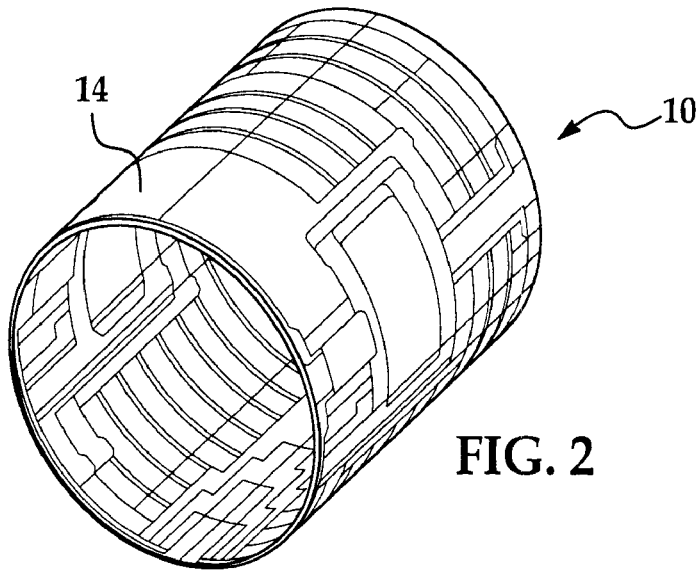
FIG. 2 is an isometric view of an aircraft fuselage comprising collective sequences of composite tape.

As shown in FIG. 2, the part 10 comprises a plurality of composite material sequences 14, each containing one or more ply segments of composite tape. The sequences 14 generally represent layers of composite material that form the composite part 10, and ply segments generally represent a region of a composite material layer.

Figure 3:
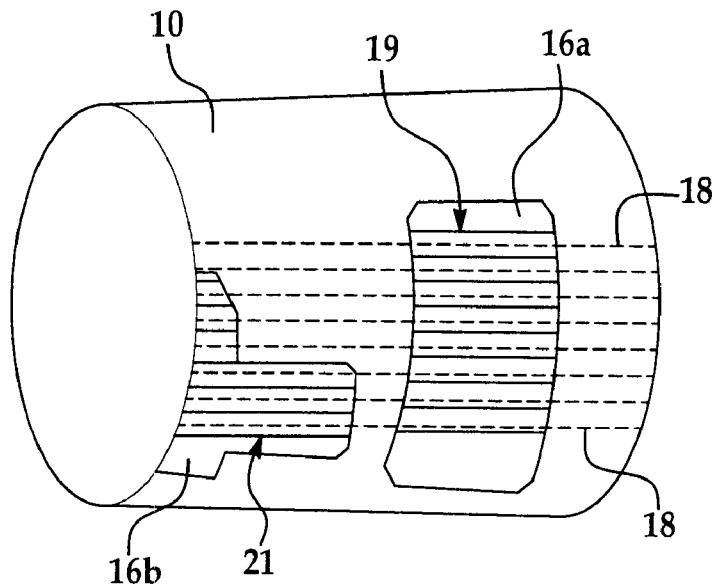
FIG. 3 is a perspective view of the fuselage shown in FIG. 2, illustrating composite material application paths and tape courses.

FIG. 3 illustrates first and second ply segment boundaries 16a, 16b. Eight contiguous composite material segments, in this case tape courses 19 which correspond to the composite material application paths 18, are delineated within the first ply boundary 16a. Likewise, seven contiguous composite tape courses 21 are delineated within the second ply boundary 16b. Although the composite material application paths 18 and tape courses 19, 21 shown in FIG. 3 are generally horizontal, with the zero degree fiber orientation, additional plies (not shown) may have other fiber orientations such as, without limitation, 90 degrees or 45 degrees or any suitable fiber orientation to satisfy the composite part design requirements.

Figure 4:
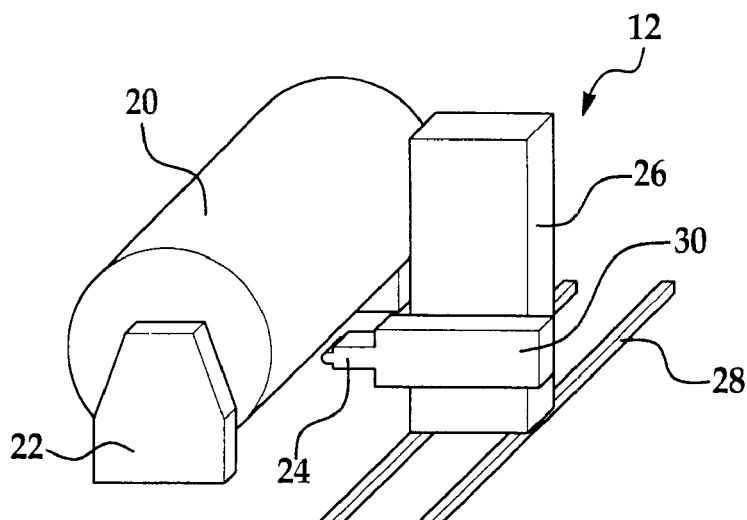
FIG. 4 is an isometric view of an automated tape laydown operation for fabricating the fuselage shown in FIG. 2.

The tape courses 19, 21 may be applied to a tool or mandrel 20 using an automatically controlled, composite tape laydown machine, generally indicated by the numeral 12 in FIG. 4. The laydown machine 12 is employed to apply composite tape to the generally cylindrical mandrel 20 which is journalled for rotation about its central axis on supports 22. The laydown machine 12 includes a head assembly 24 supported on an arm 30 that is vertically displaceable on a carriage 26. The carriage 26 is movable along tracks 28.

Figure 5:
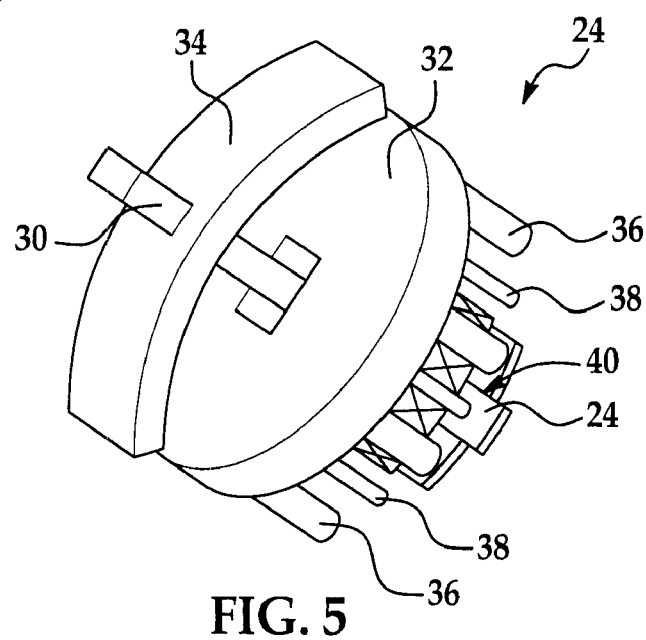
FIG. 5 is a perspective view illustrating an application head of a tape laydown used in the operation shown in FIG. 4.

Although the illustrated tape laydown machine 12 is depicted as having a single head assembly 24, the machine 12 may have multiple head assemblies 24 mounted on a common carriage 26. Additional details of a head assembly 24 are shown in FIG. 5. An application head 32 is mounted for arcuate movement on a curved support 34 carried on the end of arm 30. Other arrangements for mounting the application head 32 are possible. The application head 32 may be either a tape laying head or a tow placement head that lays down and cuts off strips of composite tape over the mandrel 20. The tape application head 32 may be configured to apply composite tape having a typical or nominal width of, for example, without limitation, three inches, six inches or any other suitable width. The tow or slit tape application head 32 may also apply a strip or multiple strips of composite tape having typical narrow widths, such as one eighth inch, one quarter inch or one half inch wide tows or slit tape.

The specific operating characteristics, dynamics and configuration of the tape laydown machine 12 may vary. For example, various types of the machine 12 may differ in acceleration, axes velocities, the number of heads used per machine, the number of machines used per lay-up cell, etc. Thus, the tape laydown machines 12 may have differing constraints, limitations and capabilities which may need to be taken into consideration in programming the machine 12 to efficiently lay down tape. Additionally, there may be unique operational condition variables that may affect overall productivity, such as variations in between material cutting and material adding reliabilities, direction of travel, head turnaround motion, and other preferred operations conditions that can affect the overall machine productivity.

Figure 6:
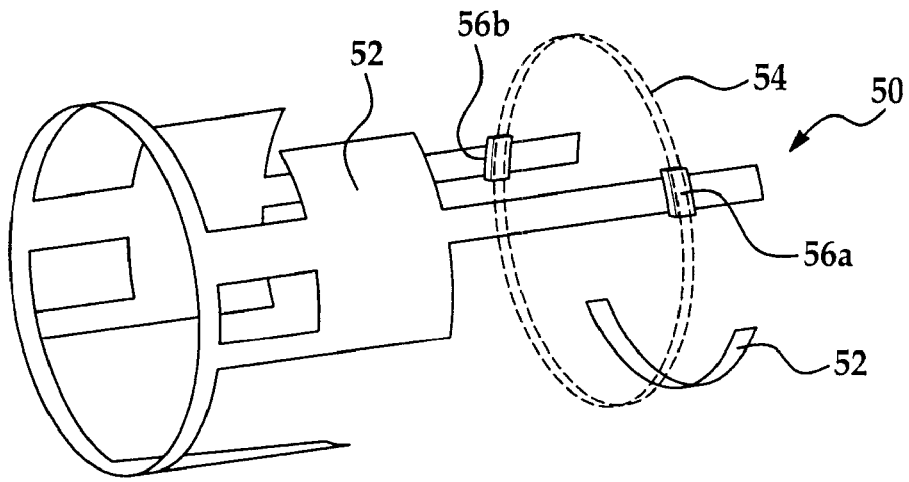
FIG. 6 is a perspective view of a single sequence of composite tape for the fuselage illustrated in FIG. 2.

FIG. 6 illustrates a single sequence 52 of tape courses used to fabricate part 10. The dotted line 54 designates the one possible path of the tapehead 32, in which two, in-line tape courses 56a, 56b may be laid down. Depending upon the location and spatial distribution of other courses used in the sequence 52, the distance traveled by the application head 32 between courses 56a, 56b may comprise unnecessary, non-productive motion of the application head 32 which reduces the overall rate at which tape may be laid down on the part 10.

Figure 7:
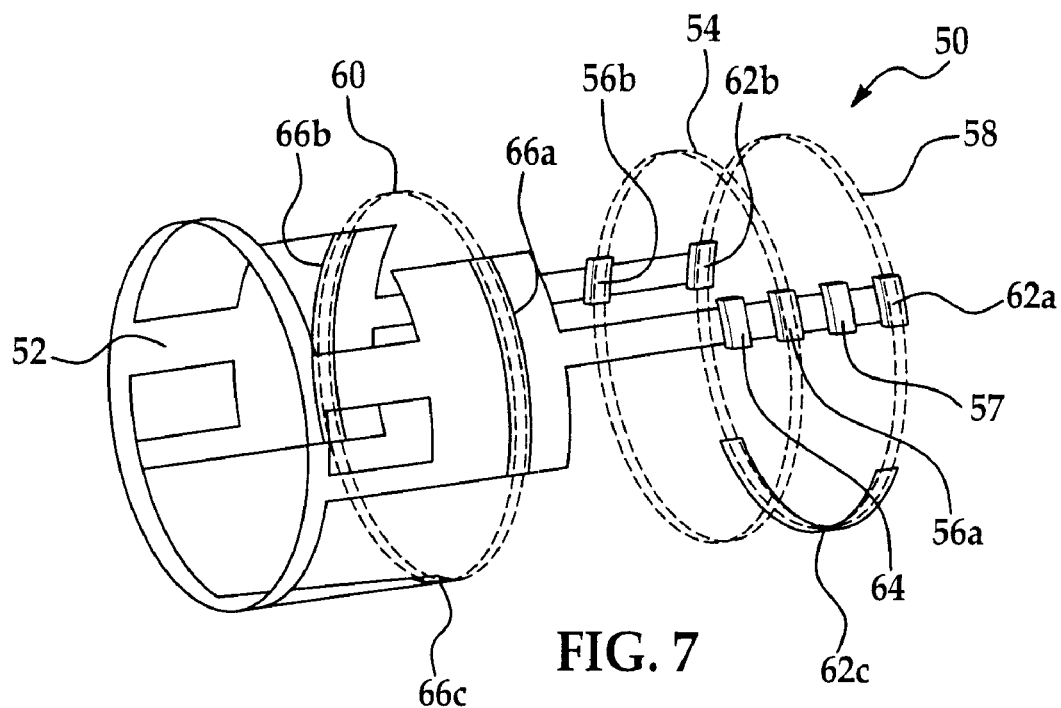
FIG. 7 is a view similar to FIG. 6 but illustrating optional groupings and partitioning of courses for the sequence.

FIG. 7 illustrates multiple circular application paths 54, 58, 60, which are longitudinally spaced along the central axis of the sequence 52. Two, circumferentially spaced courses 56a, 56b lie along path 54. Three courses 62a, 62b and 62c lie along path 58, and three circumferentially spaced courses 66a, 66b and 66c lie along the circular application head paths 60. Two additional courses 57, 64 are longitudinally aligned with course 56a. The relative positions of the tape courses 56, 57, 62, 64 and 66 result in multiple possibilities for application head motion that may be analyzed to determine the order of paths that result in the least amount of non-productive motion. For example, the application head 32 might follow the circular paths 54, 58 in order to lay down courses 56a and 62a. On the other hand, a linear path of movement of the application head 32 that successively lays down courses 64, 56a, 57 and 62a may result in a lesser amount of non-productive motion.

Figure 8:
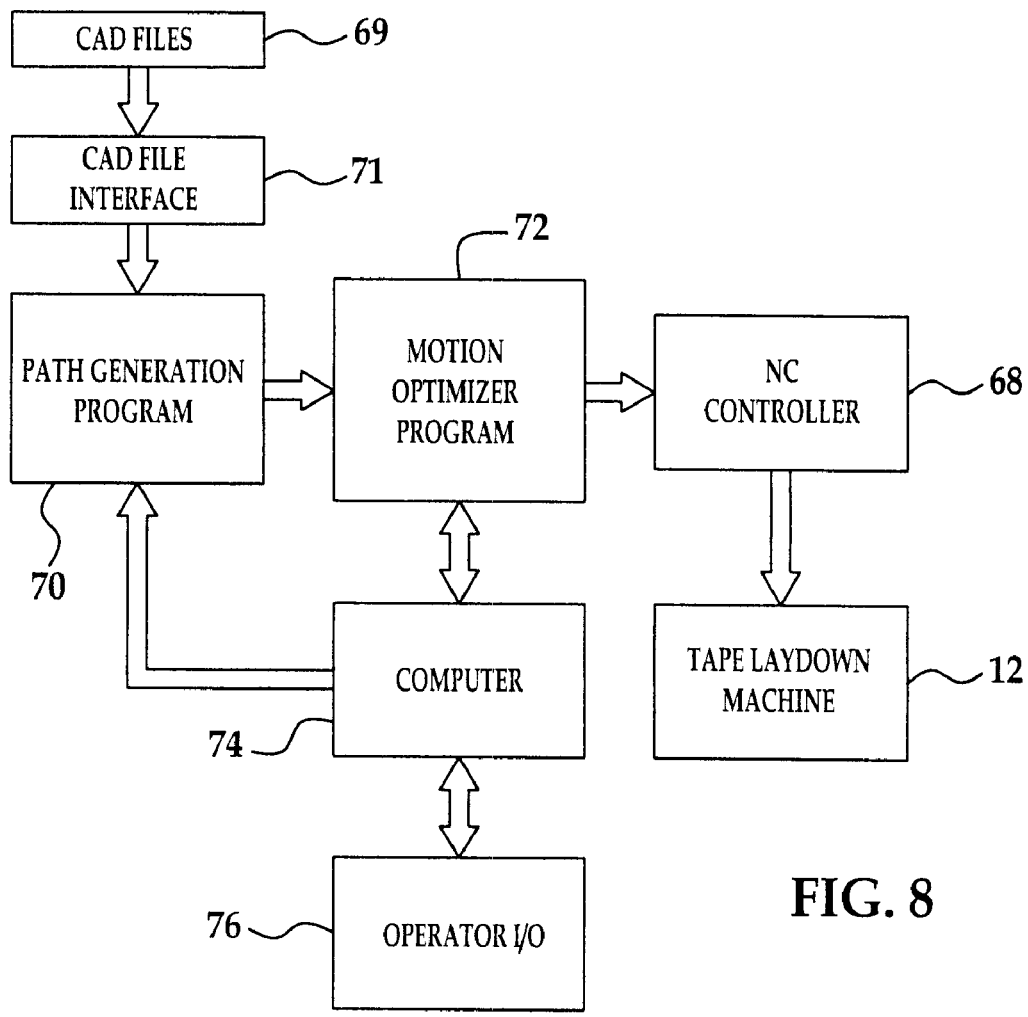
FIG. 8 is an overall block diagram illustrating system components used in carrying out the method embodiments.

Referring now to FIG. 8, in accordance with embodiments of the disclosure, motion of the application head 32 is optimized using a method that may be implemented by programmed instructions forming a motion optimizer program 72. One or more tape laydown machines 12 may be operated by an NC controller 68. The NC controller 68 controls motions of the application head 32 as well as other machine functions such as tapefeed, tape cut-off etc. The NC controller 68 may include a set of programmed instructions which control the machine movements, including the path of travel of the application head 32. These programmed instructions may be produced by a path generation program 70, such as that disclosed in U.S. patent application Ser. No. 11/269,905 filed Nov. 9, 2005; U.S. patent application Ser. No. 11/315,101 filed Dec. 23, 2005 and published as US-2007-0144676-A1 on Jun. 28, 2007; and U.S. patent application Ser. No. 11/315,103, filed Dec. 23, 2005 and published as US-2007-0150087-A1 on Jun. 28, 2007, the entire disclosures of which are incorporated by reference herein.

The path generation program 70 generates the programmed instructions used by the NC controller 68 based on a set of CAD files 69 which may define the composite part 10 in terms of sequences containing ply segments of composite tape. As previously mentioned, the sequences generally represent layers of a composite material that form the composite part, and ply segments generally represent a region of a composite material layer. In the CAD data format, for example, each ply segment may be modeled as a boundary on a complex surface, with associated material and orientation properties. A CAD file interface 71 may be used to convert the composite part definition data format unique to a specific CAD system that is compatible with the path generation program 70. Based on the composite part surface definition and ply definitions, the path generation program 70 produces a set of programmed instructions that define the paths to be followed by the application head 32.

The motion optimizer program 72 may comprise a set of programmed instructions that are utilized directly by the NC controller 68, and functions to optimize the head paths determined by the path generation program 70. A computer 74 may be used to modify or access the program 72 or to alter the programmed instructions that control the NC controller 68. The computer 74 may be provided with an operator input/output device 76, which may comprise, for example, a keyboard and/or display.

Figure 9:
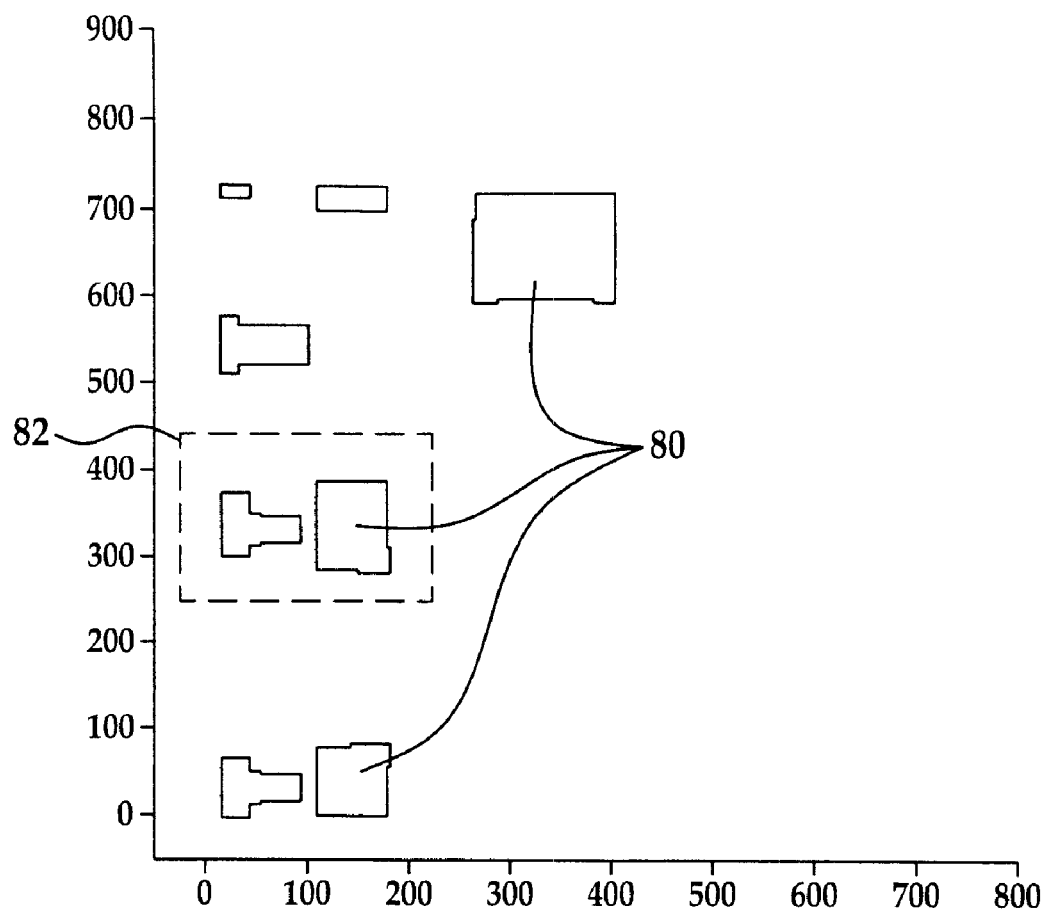
FIG. 9 is a plan view illustrating the spatial relationships between ply segments.
Figure 10A:
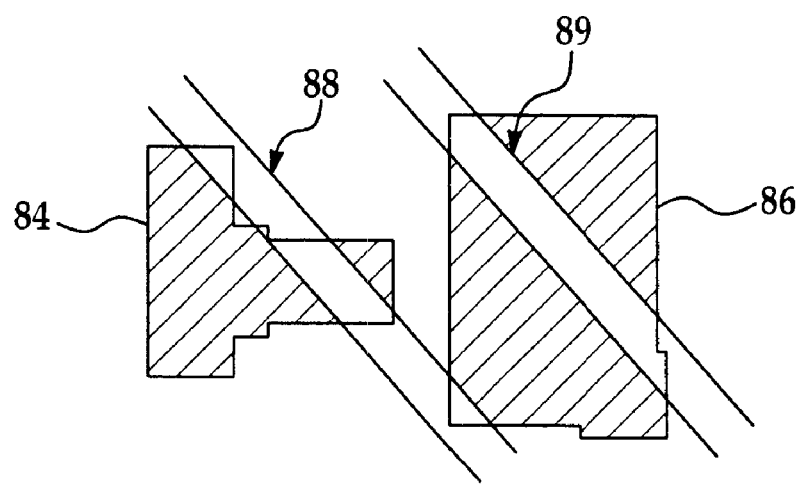
FIGS. 10a and 10b are plan illustrations of two adjacent ply segments shown in FIG. 9, illustrating grouping of courses to reduce non-productive machine motion.
Figure 10B:
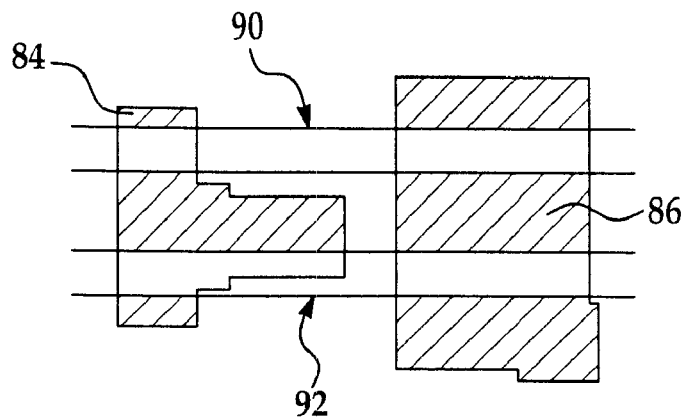

FIG. 9 represents a sequence comprising typical ply segments 80. In accordance with the disclosed embodiments, the motion optimizer program 72 functions to determine the optimum applicator head 32 motions for most efficiently laying down courses for each of the plies in the segments 80. A pair of the adjacent segments 80 designated at 82 are shown in FIGS. 10a and 10b. FIG. 10a shows two adjacent ply segments 84, 86, and a single diagonal applicator head 32 path that results in a course 88. FIG. 10b shows alternate applicator head paths 90, 92 that result in a different set of courses being laid down. The paths 88 and 89 shown in FIG. 10a represent two alternate choices for analyzed by the motion optimizer program 72 in order to minimize course-to-course motion of the applicator 32. Similarly, paths 90 and 92 shown in FIG. 10b represent two alternate choices for a different fiber orientation analyzed by the motion optimizer program 72 in order to minimize course-to-course non-productive motion of the applicator 32.

Figure 11:
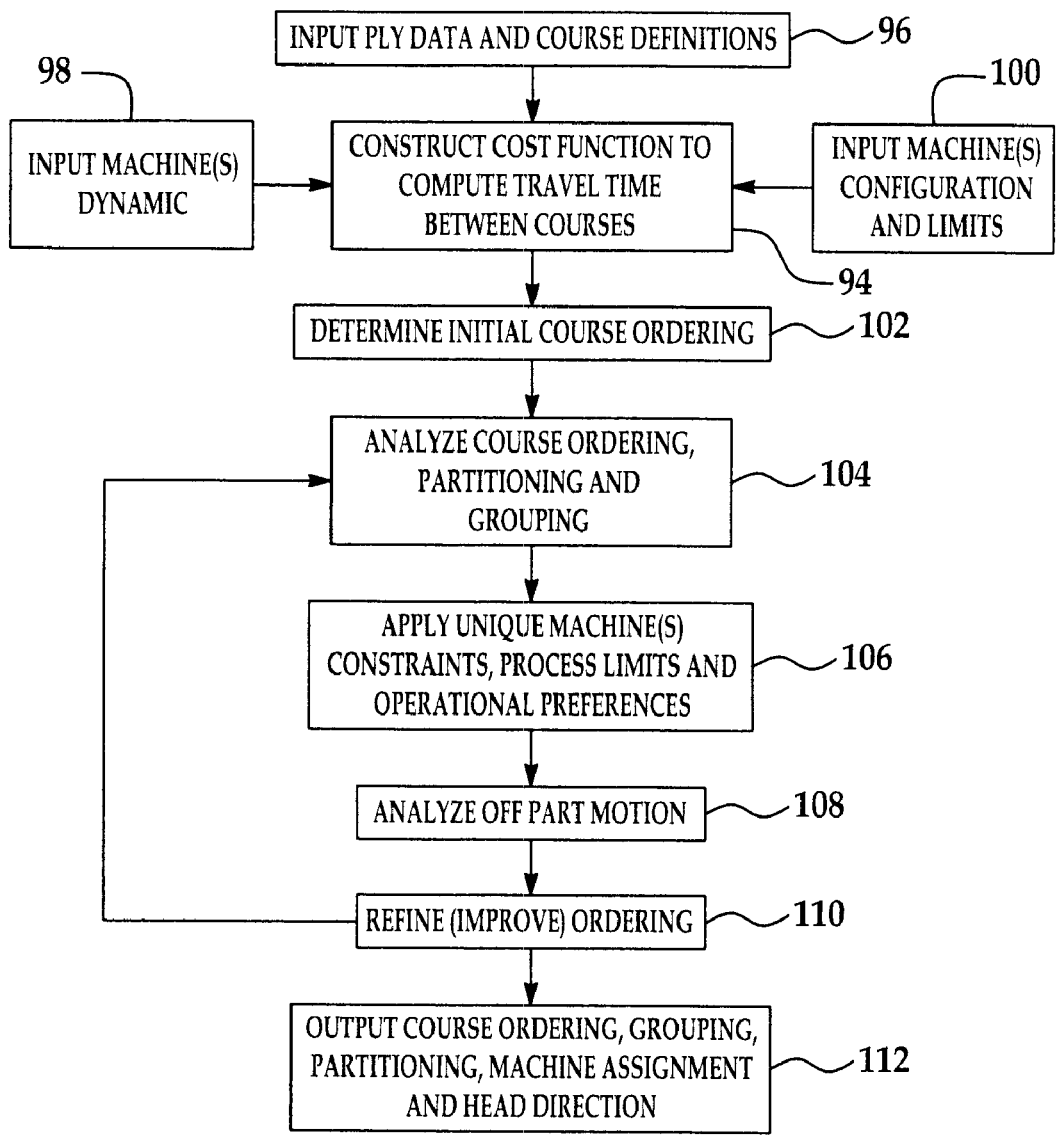
FIG. 11 is a flow diagram illustrating the steps of a method embodiment

Attention is now directed to FIG. 11 which illustrates a method utilized by the motion optimizer program 72. At step 94, a cost function is constructed which allows computation of the travel time of the applicator head 32 between the courses. In order to construct the cost function at 94, machine dynamics 98 are input at 98, the ply data and course definitions are input at step 96, the configuration and operating limits of the particular machine, as well as process restraints, operational preferences are input at step 100. Thus, the cost function at 94 is based on the dynamics, configuration, process constraints, operational preferences and limits of the particular laydown machine, as well as a definition of the part 10 in terms of ply data and course definitions.

Next, at step 102, an initial course ordering is determined. This initial course ordering will depend upon the particular part configuration, but generally may comprise any technique for systematically defining an order for the courses. At step 104, course partitioning and grouping are analyzed. The analysis performed at step 104 determines many or all of the possible combinations for partitioning and grouping plies in a manner that minimizes non-productive movement of the tapehead 32. The analysis performed in step 104 utilizes the cost function constructed at step 94 in order to select the optimum course partitioning and groupings.

At step 106, the method further optimizes course ordering by applying user input information that is tailored for the particular machine, material and unique processing requirements for the machine, including the machine information input at steps 98, 100. Next, at step 108, the non-productive motion of the applicator head 32 is analyzed based on a preliminary course partitioning and grouping resulting from the analysis at step 104, and modified by the machine constraints at step 106. Based on the results of the non-productive motion analyzed at step 108, the course ordering is refined at step 110 by repeating steps 104, 106 and 108. When the refinement process at 110 indicates that the non-productive motion has been minimized, a final course ordering, which includes grouping and partitioning as well as machine assignment and head direction is output at step 112.

Figure 12:
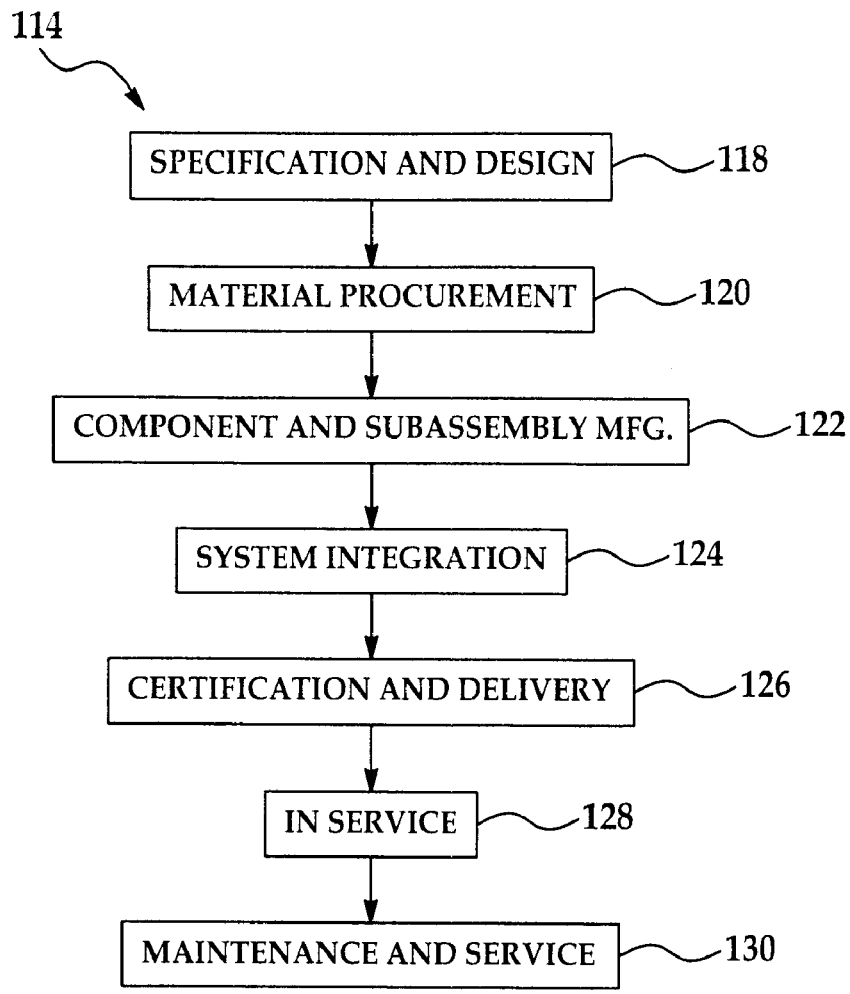
FIG. 12 is a flow diagram of aircraft production and service methodology.
Figure 13:
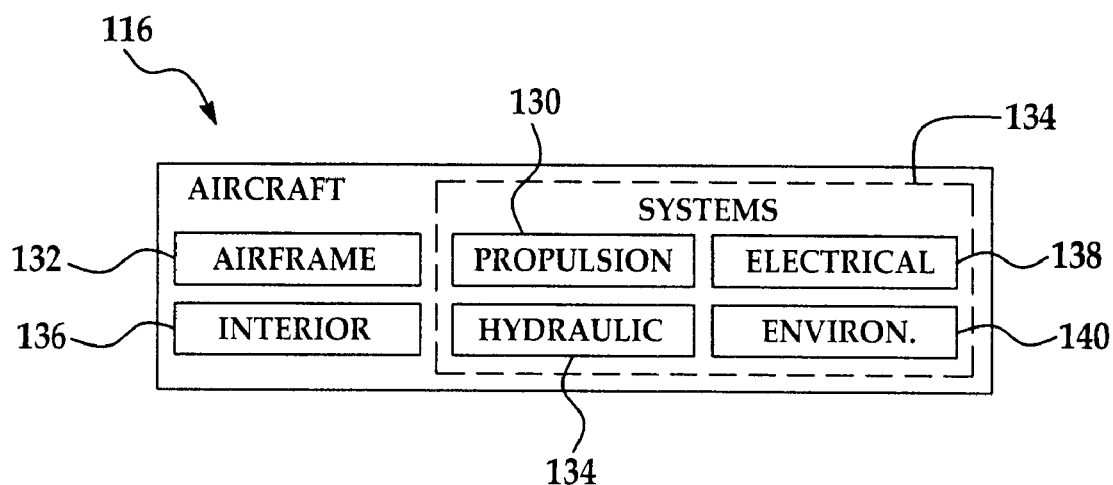
FIG. 13 is a block diagram of an aircraft.

Embodiments of the disclosure may find use in a variety of potential applications, particularly in the transportation industry, including for example, aerospace and automotive applications. Thus, referring now to FIGS. 12 and 13, embodiments of the disclosure may be used in the context of an aircraft manufacturing and service method 114 as shown in FIG. 12 and an aircraft 116 as shown in FIG. 13. Aircraft applications of the disclosed embodiments may include, for example, without limitation, composite stiffened members such as fuselage skins, wing skins, control surfaces, hatches, floor panels, door panels, access panels and empennages, to name a few. During pre-production, exemplary method 114 may include specification and design 118 of the aircraft 116 and material procurement 120. During production, component and subassembly manufacturing 122 and system integration 124 of the aircraft 116 takes place. Thereafter, the aircraft 116 may go through certification and delivery 126 in order to be placed in service 128. While in service by a customer, the aircraft 116 is scheduled for routine maintenance and service 130 (which may also include modification, reconfiguration, refurbishment, and so on).

Each of the processes of method 114 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 13, the aircraft 116 produced by exemplary method 114 may include an airframe 132 with a plurality of systems 134 and an interior 136. Examples of high-level systems 134 include one or more of a propulsion system 130, an electrical system 138, a hydraulic system 134, and an environmental system 140. Any number of other systems may be included. Although an aerospace example is shown, the principles of the disclosure may be applied to other industries, such as the automotive industry.

Apparatus and methods embodied herein may be employed during any one or more of the stages of the production and service method 114. For example, components or subassemblies corresponding to production process 122 may be fabricated or manufactured in a manner similar to components or subassemblies produced while the aircraft 116 is in service. Also, one or more apparatus embodiments, method embodiments, or a combination thereof may be utilized during the production stages 122 and 124, for example, by substantially expediting assembly of or reducing the cost of an aircraft 116. Similarly, one or more of apparatus embodiments, method embodiments, or a combination thereof may be utilized while the aircraft 116 is in service, for example and without limitation, to maintenance and service 130.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of optimizing the operation of an automated tape laydown machine used to fabricate a composite structure in which the tape is laid down in sequences each including courses forming one or more tape ply segments, comprising the steps of:
    (A) analyzing the course structure for each of the ply segments;
    (B) identifying non-productive motion of the laydown machine during movement between courses;
    (C) ordering the courses for each ply to reduce the non-productive motion identified in step (B); and,
    (D) generating a set of machine readable instructions for controlling the laydown machine based on the ordering performed in step (C).

2. The method of claim 1, further comprising the step of:
    (E) determining whether the non-productive motion identified in step (B) exceeds a threshold value.

3. The method of claim 1, wherein step (C) includes:
    performing a preliminary ordering of the courses,
    identifying non-productive motion of the laydown machine during movement between the courses using the preliminary ordering, and
    improving the ordering of the courses based on the identification of non-productive motion using the preliminary ordering.

4. The method of claim 1, wherein step (C) includes grouping separate courses of ply segments in a sequence.

5. The method of claim 1, wherein step (C) includes partitioning a single course of a ply into multiple courses within a ply.

6. The method of claim 1, further comprising the steps of:
    (E) determining characteristics related to the laydown machine; and
    (F) altering the ordering of the courses based on the results of step (E).

7. An aircraft subassembly fabricated by a tape laydown machine optimized by the method of claim 1.

8. Fabricating a vehicle assembly using a tape laydown machine optimized by the method of claim 1.

9. A method of operating a numerically controlled tape laydown machine used to fabricate a composite part, comprising the steps of:
    (A) determining possible orders in which courses of the tape may be laid down by the tape laydown machine;
    (B) selecting one of the orders determined in step (A) that optimizes the non-productive movement of the laydown machine;
    (C) generating a set of machine-readable instructions for controlling the tape laydown machine based on the order of courses selected in step (B); and
    (D) controlling the tape laydown machine using the machine readable instructions generated in step (C).

10. The method of claim 9, wherein step (B) includes identifying non-productive motion of the laydown machine during movement between courses for each of the orders determined in step (A).

11. The method of claim 9, wherein step (A) includes analyzing multiple groupings and partitions of the courses.

12. The method of claim 9, wherein steps (A) and (B) are performed using a programmed computer.

13. The method of claim 9, further comprising the steps of:
    (E) for each of the orders determined in step (A), determining the non-productive motion of the laydown machine; and,
    (F) determining whether the value of the non-productive motion determined in step (E) exceeds a preselected value.

14. The method of claim 9, wherein step (B) includes:
performing a preliminary ordering of the courses,
identifying non-productive motion of the laydown machine during movement between the courses using the preliminary ordering, and
improving the ordering of the courses based on the identification of non-productive motion using the preliminary ordering.

15. The method of claim 9, wherein step (A) includes:
grouping at least certain of the courses, and
partitioning other of the courses.

16. The method of claim 9, further comprising the steps of:
(E) determining operating characteristics related to the laydown machine, and
(F) altering the order of the courses selected in step (B) based on the results of step (E).

17. An aircraft subassembly fabricated by a tape laydown machine operated by the method of claim 9.

18. Fabricating a vehicle assembly using a tape laydown machine operated by the method of claim 9.

19. A method of minimizing non-productive motion of an automated tape laydown machine used to fabricate a composite part, comprising the steps of:
(A) selecting an initial ordering of courses over which tape may be laid down by the tape laydown machine;
(B) determining the non-productive motion of the tape laydown machine based on the initial ordering of the courses selected in step (A);
(C) revising the initial ordering of the courses to reduce the non-productive motion; and,
(D) finalizing the ordering of the courses when the non-productive motion has been minimized.

20. The method of claim 19, further comprising the steps of:
(E) generating definitions of the tape courses and plies for each tape laying sequence required to fabricate the composite part.

21. The method of claim 19, further comprising the step of:
(E) determining operating limits of the tape laydown machine, including operational preferences and process limitations, and,
wherein step (C) is performed based on the operating limits determined in step (E).

22. The method of claim 19, wherein step (B) includes determining the time that the tape laydown machine is not laying down tape on one of the courses in the initial ordering of courses.

23. The method of claim 19, wherein step (B) includes:
generating a cost function for the non-productive motion, and,
using the cost function to determine the time traveled by the tape laying machine between courses in the initial ordering of courses.

24. The method of claim 19, further comprising the step of:
(E) using the course ordering finalized in step (E) to generate a set of programmed instructions used for controlling the operation of the tape laying machine.

25. An aircraft subassembly fabricated by a tape laydown machine operated using the method of claim 19.

26. Fabricating a vehicle assembly using a tape laydown machine operated using the method of claim 19.

* * * * *